(12) United States Patent
Giannetta et al.

(10) Patent No.: US 9,836,213 B2
(45) Date of Patent: Dec. 5, 2017

(54) ENHANCED USER INTERFACE FOR PRESSURE SENSITIVE TOUCH SCREEN (75) Inventors: Michael J. Giannetta, Centerport, NY (US); Chari S. Madhusoodhana, Bangalore (IN)

(73) Assignee: Symbol Technologies, LLC, Holtsville, NY (US)

( * ) Notice: Subject to any disclaimer, the term of this patent is extended or adjusted under 35 U.S.C. 154(b) by 353 days.

(21) Appl. No.: 13/559,700

(22) Filed: Jul. 27, 2012

(65) Prior Publication Data

US 2014/0028606 A1 Jan. 30, 2014

(51) Int. Cl.
G06F 3/045 (2006.01)
G06F 3/0488 (2013.01)

(52) U.S. Cl.
CPC .................. *G06F 3/04886* (2013.01)

(58) Field of Classification Search
CPC .................................. G06F 3/04886
USPC .................................. 345/173, 174
See application file for complete search history.

(56) References Cited

U.S. PATENT DOCUMENTS

| | | | |
|---|---|---|---|
| 5,128,672 A * | 7/1992 | Kaehler | G06F 3/0238 341/23 |
| 5,818,437 A | 10/1998 | Grover et al. | |
| 6,073,036 A | 6/2000 | Heikkinen et al. | |
| 6,271,835 B1 * | 8/2001 | Hoeksma | G06F 3/04886 345/168 |
| 6,621,425 B2 * | 9/2003 | Maeda | G06F 11/006 257/E23.179 |
| 6,724,370 B2 * | 4/2004 | Dutta | G06F 1/1626 341/22 |
| 7,194,239 B2 | 3/2007 | Mäntyjärvi et al. | |
| 7,620,894 B1 | 11/2009 | Kahn | |
| 8,009,146 B2 | 8/2011 | Pihlaja | |
| 8,462,123 B1 * | 6/2013 | Sears | 345/173 |
| 2006/0066618 A1 * | 3/2006 | Repka | G06F 3/018 345/467 |
| 2008/0024459 A1 | 1/2008 | Poupyrev et al. | |
| 2009/0007001 A1 * | 1/2009 | Morin et al. | 715/773 |
| 2009/0179863 A1 * | 7/2009 | Tahir | G06F 3/0237 345/169 |
| 2009/0183098 A1 | 7/2009 | Casparian et al. | |

(Continued)

OTHER PUBLICATIONS

PCT International Search Report and Written Opinion in Application No. PCT/US2012/049963 dated Oct. 1, 2013 in counterpart U.S. Appl. No. 13/559,700.

(Continued)

*Primary Examiner* — Benyam Ketema (57) ABSTRACT

A device and method provides predictive visual indicators. The method includes displaying a user interface on a pressure sensitive touch screen display device of an electronic device. The user interface includes a plurality of contact areas. The method includes receiving a first touch input data on a first contact area. The first touch input data includes force data. The method also includes determining a second contact area as a function of the first touch input data and the first contact area. The second contact area is indicative of a prediction for a second, subsequent touch input data. The method includes displaying at least one predictive visual indicator that corresponds to the second contact area in response to the prediction.

16 Claims, 3 Drawing Sheets (56) References Cited

U.S. PATENT DOCUMENTS

| | | | |
|---|---|---|---|
| 2010/0039393 A1* | 2/2010 | Pratt | G06F 3/0236 |
| | | | 345/173 |
| 2010/0066695 A1* | 3/2010 | Miyazaki | 345/173 |
| 2011/0050576 A1 | 3/2011 | Forutanpour et al. | |
| 2011/0066962 A1 | 3/2011 | Nash et al. | |
| 2011/0074685 A1 | 3/2011 | Causey et al. | |
| 2011/0119623 A1* | 5/2011 | Kim | 715/808 |
| 2011/0179355 A1* | 7/2011 | Karlsson | G06F 3/04886 |
| | | | 715/702 |
| 2011/0201387 A1* | 8/2011 | Paek | G06F 3/0237 |
| | | | 455/566 |
| 2011/0210923 A1* | 9/2011 | Pasquero | G06F 3/04886 |
| | | | 345/173 |
| 2011/0285555 A1* | 11/2011 | Bocirnea | G06F 3/0202 |
| | | | 341/34 |
| 2012/0050177 A1* | 3/2012 | Simmons | G06F 1/1641 |
| | | | 345/173 |
| 2012/0306767 A1* | 12/2012 | Campbell | 345/173 |
| 2014/0003737 A1* | 1/2014 | Fedorovskaya et al. | 382/276 |
| 2015/0355805 A1* | 12/2015 | Chandler | G06F 3/0482 |
| | | | 715/784 |

OTHER PUBLICATIONS

European Office Action for European Application No. 13740448.9 dated Feb. 11, 2016.

\* cited by examiner

ENHANCED USER INTERFACE FOR PRESSURE SENSITIVE TOUCH SCREEN

FIELD OF THE DISCLOSURE

The invention relates to pressure sensing touch screen displays. More specifically, the invention utilizes pressure data and pressure history to determine whether a user is familiar with a user interface presented on a pressure sensing touch screen display, and if not, the system provides predictive assistance by, for example, highlighting a desired virtual key by enlarging it or changing its color.

BACKGROUND

Typical touch screen displays present a user interface, such as a virtual keypad for accepting user input. The user touches the screen at a location corresponding to the desired letter, number, or function. Some touch screen displays include enhanced features, such as haptic feedback that provide a sensory experience to indicate to the user that the input was accepted. For example, when a letter on a QWERTY keypad on the touch screen display is touched, a graphical indication may be used to indicate the selected letter being entered.

A user that is familiar with the layout of the user interface can navigate quickly through the keys or functions. However, those users unfamiliar with the user interface can spend considerable time "hunting" for the next key. Predictive algorithms exist which provide a user with assistance, such as suggestions, based on a stored dictionary, or historical data. For example, a user might begin typing the word "algorithm" and after typing the first few letters (e.g., "algo"), the word "algorithm" is displayed and can be selected by the user. However, these conventional touch screen displays include an objective standard for providing the assistance. That is, conventional touch screen displays may not include dynamic assistance features respective to the user.

Accordingly, there is a need for an enhanced user interface for pressure sensitive touch screens that provide assistance features relative to the user.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention describes a device and method for providing predictive visual indicators. The method comprises displaying a user interface on a pressure sensitive touch screen display device of an electronic device, the user interface including a plurality of contact areas; receiving a first touch input data on a first contact area; determining at least one second contact area as a function of the first touch input data and the first contact area, the at least one second contact area being indicative of a prediction for a second, subsequent touch input data to be received; and displaying at least one predictive visual indicator which corresponds to the at least one second contact area.

The exemplary embodiments can be further understood with reference to the following description and the appended drawings, wherein like elements are referred to with the same reference numerals. The exemplary embodiments describe an electronic device configured to provide assistance on a user interface as a user enters inputs thereon. Specifically, a visual indication is provided on the user interface indicating at least one predictive input that will subsequently be entered. The electronic device, the components thereof, the user interface, the visual indication, the predictive inputs, and a related method will be discussed in further detail below.

Figure 1:
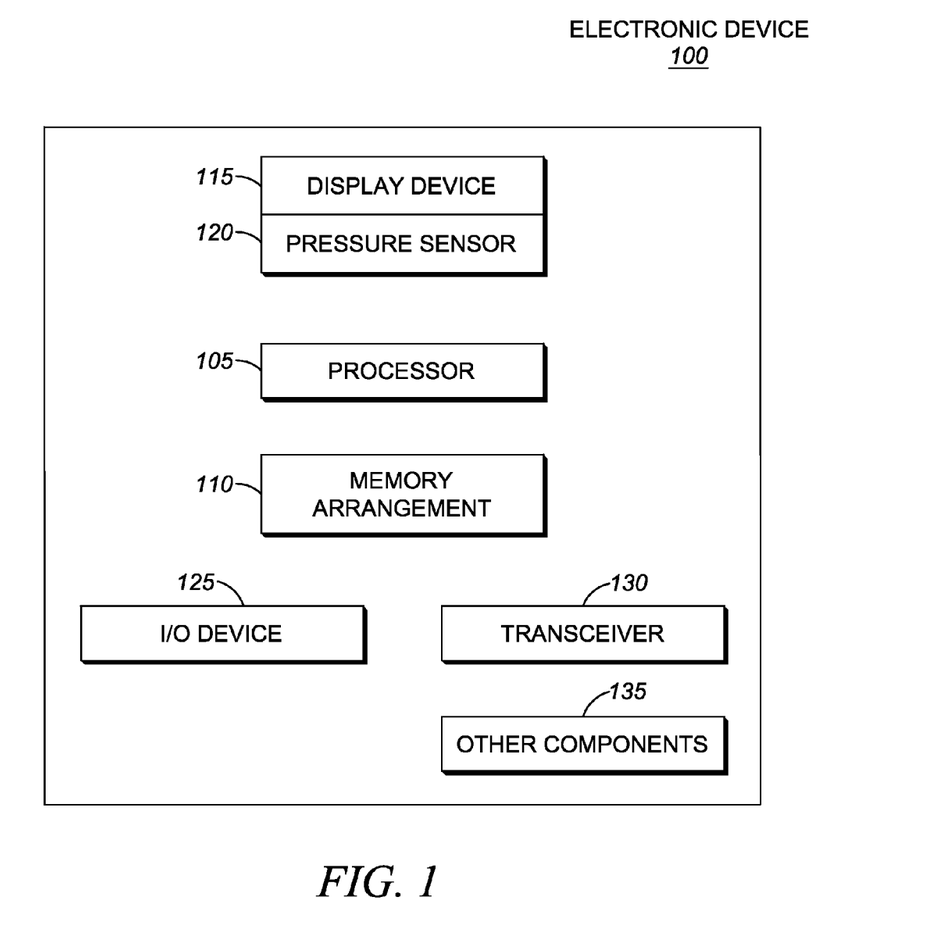
FIG. 1 illustrates a block diagram showing the internal components of an electronic device in accordance with some embodiments.

FIG. 1 is an electronic device 100 in accordance with an exemplary embodiment of the present invention. As illustrated, the electronic device 100 can be any portable device such as a mobile phone, a personal digital assistant, a smartphone, a tablet, a laptop, a barcode reader, etc. However, it should be noted that the electronic device 100 can represent any type of device that is capable of receiving a touch input on a user interface. Accordingly, the electronic device 100 can also represent a non-portable device such as a desktop computer. The electronic device 100 can include a variety of components. As illustrated in FIG. 1, the electronic device 100 can include a processor 105, a memory arrangement 110, a display device 115, a pressure sensor 120, an input/output (I/O) device 125, a transceiver 130, and other components 135 such as a portable power supply (e.g., a battery).

The processor 105 can provide conventional functionalities for the electronic device 100. For example, the MU 100 can include a plurality of applications that are executed on the processor 105 such as an application including a web browser when connected to a communication network via the transceiver 130. As will be discussed in further detail below, the processor 105 can also receive touch input data to determine whether to provide predictive visual indications on the user interface. The memory 110 can also provide conventional functionalities for the electronic device 100. For example, the memory 110 can store data related to operations performed by the processor 105. As will be described in further detail below, the memory 110 can also store data related to the predictive visual indications. For example, through predictive algorithms, subsequent inputs to be received on the user interface can be altered with the predictive visual indications. Thus, the memory 110 can store data based on a dictionary or historical data. The transceiver 130 can be any conventional component configured to transmit and/or receive data. The transceiver 130 can therefore enable communication with other electronic devices directly or indirectly through a network. In an exemplary embodiment of the present invention when the processor 105 is not configured to provide the predictive visual indications, the transceiver 130 can transmit the touch input data to a remote source such as a remote processor of a network that determines the predictive visual indications to be shown and receives that data.

The display device 115 can be any component configured to show data to a user. The display device 115 can be, for example, a liquid crystal display (LCD) to conform to the size of the electronic device 100. The I/O device 125 can be any component configured to receive an input from the user. For example, the I/O device 125 can be a keypad (e.g., alphanumeric keypad, numeric keypad, etc.). The I/O device 125 can also be a touch sensing pad for a user to enter inputs manually with a finger(s) or a stylus. According to the exemplary embodiments of the present invention, the display device 115 can incorporate the I/O device 125 as a touch screen display so that the I/O device 125 is a touch sensing pad on the display device 115 including an area in which the user can enter inputs. For example, the I/O device 125 can be a transparent touch sensor placed on top of the display 115 that enables a user to enter inputs. Accordingly, when touch input data is received on the display device 115 and the I/O device 125, the touch input data can be interpreted by the processor to determine a data input or command corresponding to the touch input data. The display device 115 and the I/O device 125 can be configured with a pressure sensor 120 used to determine an amount of force being applied on the display device 115 with the touch input data. Accordingly, the pressure sensor 120 can provide force data related to how a user enters the touch input data. It should be noted that the exemplary embodiments of the present invention can also be used for a separate I/O device 125 disposed on a separate area of a housing on the electronic device 100.

According to the exemplary embodiments of the present invention, the touch screen display including the display device 115 and the I/O device 125 can be configured to show a user interface thereon to receive touch input data. For example, when an application is being executed on the electronic device 100, a respective user interface can be shown such as a word processing application displaying an alphanumeric keypad user interface. The touch input data can include a plurality of parameters that indicate the command to be executed. For example, the touch input data generated by the user can include an input location of a desired functionality on the touch screen display, a function activated in response to the touch input data, a magnitude of the force applied at the location (via the pressure sensor 120), a duration of the force being applied, a time period between the touch input and a further touch input, etc. Through these various parameters, the processor 105 can determine the command.

As discussed above, the processor 105 can further be configured to provide predictive visual indications on the user interface. The predictive visual indications can allow the user to more easily enter subsequent touch input data, particularly when the user is unfamiliar with a layout of the user interface. For example, if the user is unfamiliar with a QWERTY layout for the alphanumeric keypad, the processor 105 can utilize predictive algorithms to determine a word being attempted to be entered by the user. The processor 105 can subsequently provide the predictive visual indications such as highlighting letters on the user interface that the user can enter as a function of at least one previously entered touch input data. In another example, the layout for the user interface can relate to a plurality of functionalities of the application in use. The processor 105 can utilize predictive algorithms to determine a subsequent functionality to be used and therefore include the predictive visual indications for the subsequent functionalities. For example, when "cut/copy/paste" functionality is included in the application, when a user selects the "copy" functionality, the processor 105 can provide a predictive visual indication for the "paste" functionality.

Figure 2A:
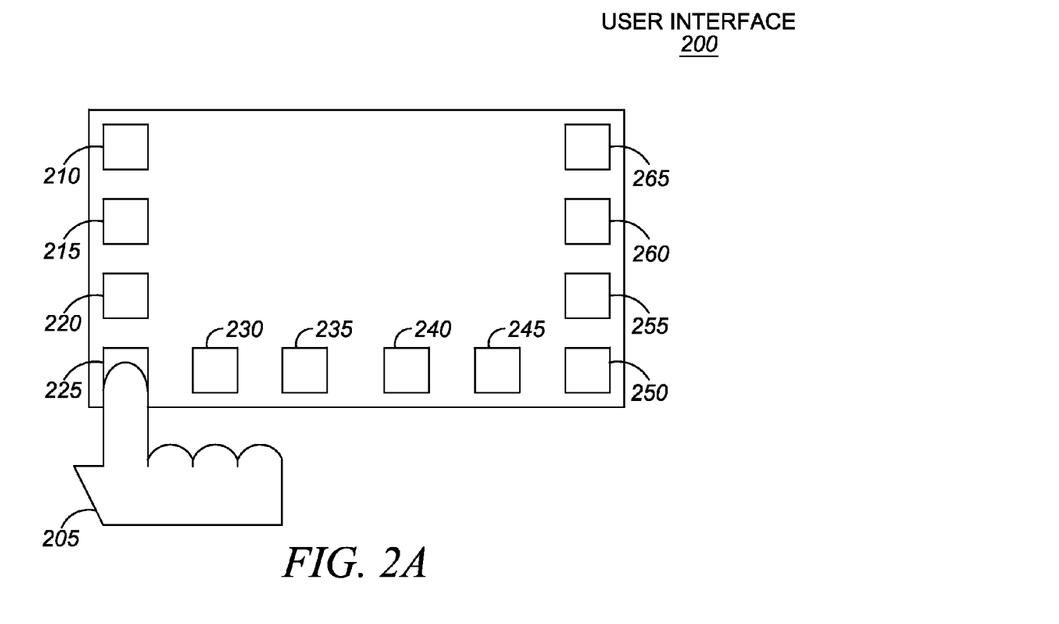
FIG. 2A illustrates a perspective view of a user interface shown on the display device of FIG. 1 in accordance with some embodiments.

FIG. 2A illustrates a perspective view of a user interface 200 shown on the display device 115 of FIG. 1 in accordance with some embodiments. The user interface 200 can include a plurality of locations in which the user is allowed to select a particular functionality. As shown, the user interface 200 can include virtual keys such as keys 210-265. Each key 210-265 can be predetermined with a particular command to be executed should the user select the key. It should be noted that the disposition of the keys 210-265 is only exemplary and the user interface 200 can be configured with any number of layouts. It should also be noted that the use of the twelve keys 210-265 is only exemplary. As discussed above, the user interface 200 can be an alphanumeric keypad including at least 26 keys representing letters, 10 keys representing numbers, a key representing a space, further keys representing punctuation, etc. Also shown in FIG. 2A is a user's hand 205. The user's hand 205 can select one of the keys 210-265 and, as shown, can be key 225. However, it should be noted that other forms of touch input data can be used. For example, the touch screen display can be configured to receive touch input data from a user's hand, a user's finger, a user's palm, a stylus, etc.

Figure 2B:
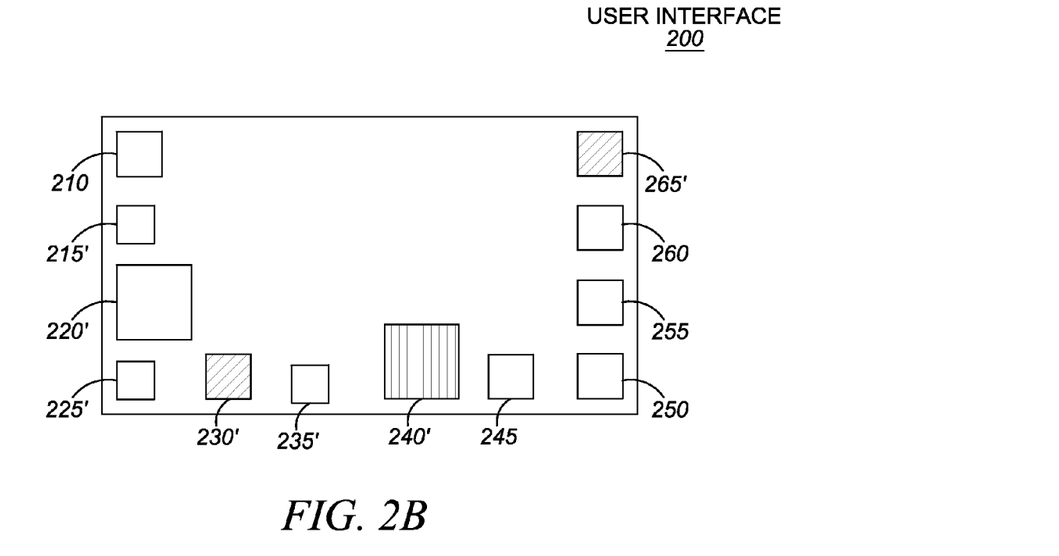
FIG. 2B illustrates a perspective view of the user interface shown on the display device of FIG. 1 with predictive visual indications in accordance with some embodiments.

FIG. 2B illustrates a perspective view of the user interface 200 shown on the display device 115 of FIG. 1 with predictive visual indications in accordance with some embodiments. The predictive visual indications can be provided as a function of previously entered touch input data. Thus, FIG. 2B can represent how the user interface 200 is altered with the predictive visual indications when the user's hand 205 enters the touch input data from touching the key 225 in FIG. 2A. The predictive visual indications can include a variety of different forms as changes in the layout of the user interface 200. For example, as shown in FIG. 2B, keys 215, 225, and 235 are decreased in size as keys 215', 225', and 235'; keys 220 and 240 are increased in size as keys 220' and 240'; and keys 230, 240, and 265 include a color indication as keys 230', 240' and 265'. It is noted that the keys can include multiple predictive visual indications as illustrated in key 240' which has an increase in size and a change in color. It should also be noted that the use of size change and color change is only exemplary. The processor 105 can be configured to provide other forms of predictive visual indications such as arrow indicators pointing at select keys, select keys blinking, altering a shape of select keys, rearranging a layout of the user interface 200, etc.

The predictive visual indications provided on the user interface 200 can allow the user to enter subsequent touch input data more easily, particularly when the user is unfamiliar with the layout of the user interface 200. For example, the processor 105 can determine (via the predictive algorithms) that the command entered from touching the key 225 can entail select commands on the user interface 200 to potentially be subsequently entered. Select keys can have a lower likelihood of being touched. Thus, the keys 215', 225', and 235' can be decreased in size. Select keys can have a higher likelihood of being touched. Thus, the keys 220' and 240' can be increased in size. Select keys can also have a likelihood (less than keys that are increased in size) of being touched. Thus, the keys 230' 240' and 265' can include the color change. The processor 105 can determine the key having a highest likelihood to be subsequently touched. Thus, the key 240' can include more than one predictive visual indication associated therewith.

The above described exemplary embodiment can relate to when the processor 105 is configured to automatically provide the predictive visual indications on the user interface. However, it should be noted that the processor 105 can further be configured to determine or set by the user to provide the predictive visual indications. When the processor 105 is set by the user to provide the predictive visual indications, a substantially similar method can be used as described above. When the processor 105 is not set to provide the indications, the layout of the user interface 200 as shown in FIG. 2A can continuously be used. When the processor 105 is configured to determine whether to provide the indications, the processor 105 can utilize the pressure sensor 120.

According to a first exemplary embodiment of the present invention when the processor 105 determines whether to provide the predictive visual indications, the processor 105 can be aware of the functionality that the user wishes to utilize via the predictive algorithms. Based on a variety of factors from the touch input data being received from the user on the user interface, the processor 105 can further determine whether the user is familiar with the layout of the user interface. For example, if the user is required to enter data in a certain field of the user interface, the processor 105 can determine familiarity data as a function of a time factor. When the user is entering the touch input data in which a first touch input data is entered and a subsequent second touch input data is entered in comparison with a predetermined length of time, the processor 105 can determine whether the user is familiar with the layout of the user interface. Thus, when the user is able to enter the second touch input data within the predetermined length of time, this can indicate to the processor 105 that the user is familiar with the layout of the user interface while the second touch input data being entered at a time greater than the predetermined length of time can indicate to the processor 105 that the user is unfamiliar with the layout of the user interface. In another example, the processor 105 can utilize the force data received on the pressure sensor 120. When the user is entering the touch input data and is entered using a very light unsure touch, a stammering touch is used (indicating an unconfident touch), etc., the processor 105 can determine whether the user is familiar with the layout of the user interface. Thus, when the user enters the touch input data in which the force data measured by the pressure sensor 120 is less than a predetermined amount of pressure, the processor 105 can determine that the user is unfamiliar with the layout of the user interface. When the processor 105 ultimately determines that the user is unfamiliar with the layout of the user interface, the processor 105 can provide the predictive visual indications.

According to a second exemplary embodiment of the present invention when the processor 105 determines whether to provide the predictive visual indications, the user can provide log-in data. That is, the user can log into the system of the electronic device 100 (or a network via the transceiver 130). The memory 110 (or a network database) can store a pressure profile of the user. The pressure profile of the user can include data relating to force data of previously entered touch input data. For example, the pressure profile can be based upon historical data or past use of the device by the user. The pressure profile can further relate to the various layouts of user interfaces shown on the display device 115. Each use by the user can update the pressure profile during and/or after a session in which the user is logged in the system.

The processor 105 can utilize the pressure profile to determine whether to provide the predictive visual indications. For example, if the user has used a single program executed on the electronic device 100 multiple times and becomes familiar with the layout of the user interface of that program, the user's pressure history for that program will be stored in the memory 110 along with a quantity of user interactions associated with the program. During a first few interactions with the program, the user can select icons or the keys of the user interface with varying degrees of pressure until the user is familiar with the layout of the user interface. As the user becomes more familiar with the layout of the user interface, the pressure that the user exerts on the display device 115 can become more consistent (e.g., the user will no longer stammer from "hunting" for keys or icons). The processor 105 can then utilize the pressure profile of the user to determine a baseline pressure value from this program having a familiar layout of the user interface.

Once the processor 105 has determined the baseline pressure value from the pressure profile, the processor 105 can apply this data to further programs, particularly ones having an unfamiliar layout of the user interface for the user having the known pressure profile. When the user executes a further program having an unfamiliar layout of the user interface and enters touch input data indicating unfamiliarity (e.g., stammering, uneven pressure, etc.), the processor 105 receives the pressure data measured by the pressure sensor 120 to determine that the user is unfamiliar with the user interface when compared with the baseline pressure value. Accordingly, once the unfamiliarity is determined, the processor 105 can provide the predictive visual indications until the pressure profile for the further program is updated to the point where the baseline pressure value is reached for the further program as well.

Figure 3:
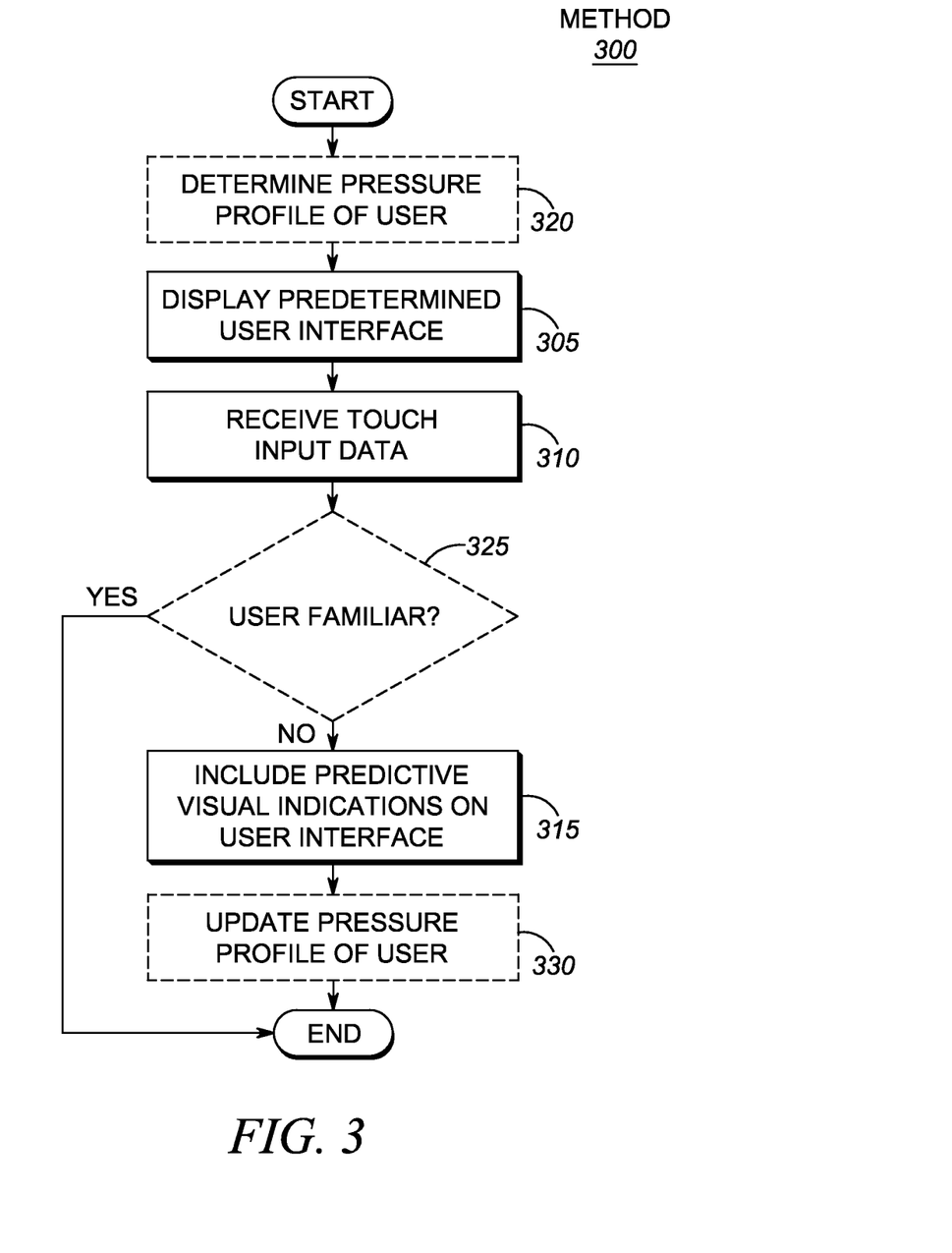
FIG. 3 is a flowchart of a method for enhancing a user interface for pressure sensitive touch screen displays in accordance with some embodiments.

FIG. 3 is a flowchart of a method 300 for enhancing a user interface for pressure sensitive touch screen displays in accordance with some embodiments. The method 300 relates to when the processor 105 provides predictive visual indications on a layout of a user interface as a function of an entered touch input data. Accordingly, the electronic device 100 can be configured or set to automatically provide the predictive visual indications. The method 300 will be described with reference to the electronic device 100 of FIG. 1 and the user interface 200 of FIGS. 2A and 2B.

In step 305, the layout of the user interface is shown on the display device 115. As discussed above, depending on the program being executed on the electronic device 100, a corresponding user interface can be used for that program. Thus, a predetermined user interface can be shown on the display device 115 as a function of the program being executed.

In step 310, the user can enter a first touch input data on the display device 115 (via, for example, the user's hand 205). As shown in FIG. 2A, the user can touch the key 225 which represents the first touch input data being entered. In step 315, the processor 105 includes predictive visual indications on the user interface 200. As shown in FIG. 2B, as a function of the first touch input data, the predictive visual indications can provide a graphical view of second touch input data to be entered and/or keys that are unlikely to be the second touch input data. As discussed above, the predictive visual indications can include a plurality of different types. For example, the keys can be altered such as changing a size thereof (e.g., decreasing the key 225 to 225', increasing the key 220 to 220'), changing a color thereof (e.g., including a color change for key 240 to 240'), changing a shape of the key, including further indications (e.g., arrows), etc. In this manner, the user can easily identify the second touch input data to be entered as a function of the first touch input data received in step 310.

The method 300 can further include additional steps. Specifically, when the processor 105 determines whether to provide the predictive visual indications, the method 300 can include optional steps 320, 325, and 330. In a first further exemplary embodiment, when the processor 105 determines whether to provide the predictive visual indications as a function of familiarity from previously entered touch input data, the method 300 can further include optional step 325. In a second further exemplary embodiment, when the processor 105 determines whether to provide the predictive visual indications as a function of a user profile and familiarity, the method 300 can further include optional steps 320, 325, 330. Thus, the description below relates to further embodiments of the method 300.

In the first further exemplary embodiment of the present invention, the method 300 can further include step 325. Thus, steps 305 and 310 can be substantially similar to that described above. After step 310, in step 325, the processor 105 can determine whether the user is familiar with the layout of the user interface. The processor 105 can utilize a variety of different factors to determine the familiarity data for the user of the program having the layout of the user interface. For example, time data can be used which determines whether touch input data is required at least a predetermined amount of time to be entered after entering a prior touch input data. When requiring more than the predetermined amount of time, the processor 105 can determine that the user is unfamiliar with the layout of the user interface. In another example, force data measured by the pressure sensor 120 can be used. Thus, if the user is entering touch input data with unsure touches (e.g., less than a predetermined force value), then the processor 105 can determine that the user is unfamiliar with the layout of the user interface. The processor 105 can utilize more than one, select ones, etc. of the factors to determine the familiarity data. If the user is unfamiliar with the layout of the user interface, the method 300 continues to step 315 to provide the predictive visual indications as discussed above. However, if the user is familiar with the layout of the user interface, the method 300 ends and the predetermined user interface being shown in step 305 can continue to be shown in a maintained state with no alterations thereto.

In the second further exemplary embodiment of the present invention, the method 300 can further include optional steps 320, 325, and 330. Initially, in step 320, the processor 105 can determine the pressure profile of the user. As discussed above, the user can log into the system so that a pressure profile is retrieved from a storage arrangement such as the memory 110 or a network database. The pressure profile can relate to when a user provides a plurality of pressure data for a particular layout of a user interface of a program. Through continuous touch input data being entered for that program, the pressure profile can be updated so that a baseline pressure value is determined for the user when the user is familiar and comfortable using the layout of the user interface for that program.

Subsequently, in step 305, a predetermined user interface for a further program is shown to the user. Steps 305 and 310 can be substantially similar to that described above. After step 310, step 325, the processor 105 can determine whether the user is familiar with the layout of the user interface as a function of the baseline pressure value from the pressure profile. Specifically, the processor 105 receives the pressure data measured by the pressure sensor 120 which is included in the touch input data of step 310 to determine that the user is unfamiliar with the user interface when compared with the baseline pressure value. If unfamiliarity is determined in step 325, the processor 105 continues to step 315 where the predictive visual indications are provided. Furthermore, in step 330, the pressure profile of the user for the further program having the predetermined user interface shown in step 305 is updated. Returning to step 325, if the user is familiar with the layout of the user interface for the further program (i.e., the user enters the touch input data with at least the baseline pressure value indicated in the pressure profile for a different program), the method 300 ends and the predetermined user interface being shown in step 305 can continue to be shown in a maintained state with no alterations thereto.

The exemplary embodiments of the present invention provide a device and method for enhancing a user interface on a pressure sensitive touch screen display. Specifically, the user interface can include a layout of keys or contacts for a plurality of commands to be entered for a particular program utilizing the user interface. A processor of the electronic device including the touch screen display can receive touch input data to provide predictive visual indications on the user interface as a function of the received touch input data. The predictive visual indications can be any type that provides a graphical indication that the selected key/contact can be an ensuing touch input data to be entered (e.g., increasing a size of the key) or the opposite (e.g., decreasing a size of the key). The processor can further be configured to automatically provide the predictive visual indications, be preset to provide the predictive visual indications, or can be configured to determine whether or not to provide the predictive visual indications, particularly from using force data of the touch input data measured on a pressure sensor associated with the touch screen display.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that can cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like can be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but can include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but can also be configured in ways that are not listed.

It will be appreciated that some embodiments can be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method, comprising:
displaying a user interface on a pressure sensitive touch screen display device of an electronic device, the user interface including a plurality of contact areas;
receiving a first touch input data at a location of a first contact area, the first touch input data including force data;
determining a location of a second contact area as a function of the first touch input data and the location of the first contact area, the location of the second contact area being different from the location of the first contact area and indicative of a determination for a second, subsequent touch input data;
determining whether to provide a predictive visual indicator of the location of the second contact area as a function of familiarity data, the familiarity data being indicative of whether a user is familiar with a layout of the user interface based at least in part on one or more predetermined parameters received when the user is entering the first touch input data; and
displaying the predictive visual indicator of the location of the second contact area when the familiarity data indicates that the user is unfamiliar with the layout of the user interface,
wherein the one or more predetermined parameters include a pressure parameter, the familiarity data including a comparison between the pressure parameter and a predetermined force value, wherein the pressure parameter being less than the predetermined force value indicates that the user is unfamiliar with the layout.

2. The method of claim 1, wherein the predictive visual indicator is at least one of an increase in a size of the contact area, a decrease in a size of the contact area, a change in color of the contact area, a change in shape of the contact area, a blinking of the contact area, and a graphical indicator pointing to the contact area.

3. The method of claim 1, wherein the first touch input data is received via at least one of a user's finger, a user's palm, and a stylus.

4. The method of claim 1, further comprising receiving a plurality of first touch input data on respective ones of the contact areas, wherein the familiarity data is determined as a function of the one or more predetermined parameters of the plurality of first touch input data.

5. The method of claim 4, wherein the one or more predetermined parameters include a time parameter, the familiarity data including a comparison between the time parameter and a predetermined time length, wherein the time parameter being greater than the predetermined time length indicates that the user is unfamiliar with the layout.

6. The method of claim 1, further comprising prior to displaying the user interface, generating a pressure profile for another user interface including other contact areas, the pressure profile including a baseline pressure value, the baseline pressure value being indicative of an amount of force applied to the other contact areas when a user is familiar with the other user interface.

7. The method of claim 6, further comprising determining whether to provide the predictive visual indicator as a function of the pressure profile of the other user interface by comparing a pressure value of the first touch input data to the baseline pressure value.

8. The method of claim 6, further comprising storing the pressure profile in a memory arrangement of the electronic device.

9. A device, comprising:
a processor configured to execute an application;
a memory arrangement storing data related to the application;
a pressure sensitive touch screen display device configured to display a user interlace including a plurality of contact areas for the application, the pressure sensitive touch screen display device further configured to receive a first touch input data at a location of a first contact area, the first touch input data including force data,
wherein the processor is configured to determine a location of a second contact area as a function of the first touch input data and the location of the first contact area, the location of the second contact area being different from the location of the first contact area and indicative of a determination for a second, subsequent touch input data and wherein the processor is further configured to determine whether to provide a predictive visual indicator of the location of the second contact area as a function of familiarity data based at least in part on one or more predetermined parameters received when the user is entering the first touch input data, the familiarity data being indicative of whether a user is familiar with a layout of the user interface,
wherein the pressure sensitive touch screen display device is configured to display the predictive visual indicator of the location of the second contact area when the familiarity data indicates that the user is unfamiliar with the layout of the user interface;
the device further comprising a pressure sensor configured to measure a force value of the first touch input data so that when the one or more predetermined parameters include a pressure parameter, the familiarity data includes a comparison between the force value of the pressure parameter and a predetermined force value, wherein the pressure parameter being less than the predetermined force value indicates that the user is unfamiliar with the layout.

10. The device of claim 9, wherein the predictive visual indicator is at least one of an increase in a size of the contact area, a decrease in a size of the contact area, a change in color of the contact area, a change in shape of the contact area, a blinking of the contact area, and a graphical indicator pointing to the contact area.

11. The device of claim 9, wherein the first touch input data is received via at least one of a user's finger, a user's palm, and a stylus.

12. The device of claim 9, wherein the pressure sensitive touch screen display device is configured to receive a plurality of first touch input data on respective ones of the contact areas, wherein the familiarity data is determined as a function of the one or more predetermined parameters of the plurality of first touch input data.

13. The device of claim 12, wherein the one or more predetermined parameters include a time parameter, the familiarity data including a comparison between the time parameter and a predetermined time length, wherein the time parameter being greater than the predetermined time length indicates that the user is unfamiliar with the layout.

14. The device of claim 9, wherein, prior to displaying the user interface, the processor is configured to generate a pressure profile for another user interface including other contact areas, the pressure profile including a baseline pressure value, the baseline pressure value being indicative of an amount of force applied to the other contact areas when a user is familiar with the other user interface.

15. The device of claim 14, wherein the processor is configured to determine whether to provide the predictive visual indicator as a function of the pressure profile of the other user interface by comparing a pressure value of the first touch input data to the baseline pressure value.

16. A computer readable storage medium including a set of instructions executable by a processor; the set of instructions operable to:
display a user interface on a pressure sensitive touch screen display device of an electronic device, the user interface including a plurality of contact areas;
receive a first touch input data at a location of a first contact area, the first touch input data including force data;
determine a location of a second contact area as a function of the first touch input data and the location of the first contact area, the location of the second contact area being different from the location of the first contact area and indicative of a determination for a second, subsequent touch input data;
determine whether to provide a predictive visual indicator of the location of the second contact area as a function of familiarity data based at least in part on one or more predetermined parameters received when the user is entering the first touch input data, the familiarity data being indicative of whether a user is familiar with a layout of the user interface; and
display the predictive visual indicator of the location of the second contact area when the familiarity data indicates that the user is unfamiliar with the layout of the user interface,
wherein the one or more predetermined parameters include a pressure parameter, the familiarity data including a comparison between the pressure parameter and a predetermined force value, wherein the pressure parameter being less than the predetermined force value indicates that the user is unfamiliar with the layout.

* * * * *